United States Patent
Yaron-Moallim

[19]

[11] Patent Number: 6,029,042
[45] Date of Patent: Feb. 22, 2000

[54] EDUCATIONAL AUDIO PLAYBACK DEVICE INCLUDING HIDDEN GRAPHICAL IMAGES LOCATED BELOW PIVOTING BUTTON ELEMENTS

[76] Inventor: Leah Yaron-Moallim, 1139 S. Bedford St., Apt. 3, Los Angeles, Calif. 90035

[21] Appl. No.: 09/277,826

[22] Filed: Mar. 29, 1999

[51] Int. Cl.[7] .............................. G09B 5/00; A63H 33/30
[52] U.S. Cl. .......................... 434/309; 434/308; 434/319; 434/320; 446/141; 446/142; 446/143; 446/408
[58] Field of Search .................................. 434/238, 308, 434/309, 318, 320; 446/141, 142; 496/309, 310, 311, 312, 408

[56] References Cited

U.S. PATENT DOCUMENTS

| | | | |
|---|---|---|---|
| 3,538,620 | 11/1970 | Kohner et al. | |
| 4,648,086 | 3/1987 | Koike | 369/65 |
| 4,866,764 | 9/1989 | Barker, III | 379/355 |
| 5,059,126 | 10/1991 | Kimball | 434/308 |
| 5,145,447 | 9/1992 | Goldfarb | 446/408 |
| 5,184,971 | 2/1993 | Williams | 446/142 |
| 5,285,437 | 2/1994 | Yokota | 369/64 |
| 5,382,188 | 1/1995 | Tomellini | 446/397 |
| 5,433,610 | 7/1995 | Godfrey et al. | 434/169 |
| 5,474,484 | 12/1995 | Lemelle | 446/142 |
| 5,545,071 | 8/1996 | Shiraishi | 446/143 |
| 5,609,508 | 3/1997 | Wingate | 446/142 |
| 5,679,049 | 10/1997 | Arrad | 446/142 |

FOREIGN PATENT DOCUMENTS

| | | |
|---|---|---|
| WO8400503 | 2/1984 | European Pat. Off. |
| 225665A | 6/1990 | United Kingdom |

Primary Examiner—Robert A. Hafer
Assistant Examiner—Bena B. Miller
Attorney, Agent, or Firm—National Patent Services; Tom Hamill, Jr.

[57] ABSTRACT

A novel educational audio playback device is disclosed which, in the preferred embodiment, is in the shape of a simulated telephone. On the body of the apparatus are a plurality of buttons, each of the buttons having a hinged cover mounted thereon. These hinged covers have indicia on their front, this indicia, in the preferred embodiment, being letters of an alphabet. Upon the user opening the hinged cover, a simulated sound of a telephone ringing is generated and the associated button is exposed. On each of the buttons is a symbol or picture that is representative of a character, object or thing that is related to the letter of the alphabet on the hinged cover. The letter "H", for example, could contain a picture of a nursery rhyme figure, such as Humpty Dumpty. Upon the user depressing the associated button, an index is generated that tells a circuit or microprocessor where on the internal sound storage portion of the device is to be found the appropriate sound segment. In the proposed circumstance, a voice would introduce itself as Humpty Dumpty, would note that Humpty Dumpty begins with the letter H, and would, perhaps, recite some or all of the nursery rhyme. The two-step process involved assists in the user remembering the relationship between the letter indicia, and the symbol or character associate with it. Various alphabets could be displayed, with an appropriate symbology and various types of sound storage devices, such as Compacts Discs, audio tape, RAM or ROM could be used, and additionally the unit could simply be used as an audio playback device.

20 Claims, 6 Drawing Sheets

EDUCATIONAL AUDIO PLAYBACK DEVICE INCLUDING HIDDEN GRAPHICAL IMAGES LOCATED BELOW PIVOTING BUTTON ELEMENTS

BACKGROUND OF THE INVENTION

1. Field of the Invention

The present invention relates to educational audio devices for children. More specifically, it relates to an educational audio device that allows the user to select a specific button cover having indicia thereon, preferably showing a letter of an alphabet: the cover pops open to show the button underneath, which has a drawing or representation of a character or thing that begins with the selected letter. Upon the user pressing the button, a recording is played that speaks a short piece relating to the character or representation of the associated original letter depicted on the cover. Even more specifically, the invention relates to an educational audio device where the recorded message played it preceded by a simulated ringing telephone sound, and that the educational audio device of the present invention includes a simulated telephone handset that the child or user holds in the usual manner while the device operates. It is also contemplated that the unit could be programmable in that different sets of messages could be placed within the unit as the user progresses in skill.

2. Description of the Prior Art

Various educational devices that utilize recording medium to deliver a message appropriate to a button pressed on the body of the device. The present invention aids in the learning process by providing a two-step process in the activation of the specific recording, the first step being the opening of a cover having indicia thereon, which could be spring-loaded to pop open when depressed. Underneath the cover is a picture or representation that elaborates on the symbol or indicium marked on the cover. With the release of the button cover, a telephone ringing sound is heard through a speaker or simulated telephone handset. When the user presses the button underneath the released cover, an associated recording is played. In preferred embodiments, the various recordings are located on a CD (compact disk) located inside the apparatus. This allows for the CD to be replaced when various steps in the learning process are completed. This two-step process in accessing the specific associated recording assists in the user learning the link between the indicium or symbol on the cover of the button, and the message that the recording conveys when the button, and its related picture or representation, is pressed. Additionally, in the preferred embodiments described herein, the symbol on the button cover is a letter of an alphabet, and the representations on the buttons underneath are nursery-rhyme characters or the like. The character associated with the letter speaks to the child on the phone. There were various related patents found during a search at the United States Patent and Trademark Office, and they are compared and contrasted with the present invention below.

First is U.S. Pat. No. 5,679,049 issued to Avi Arad et al. on Oct. 21, 1997. This discloses a toy telephone recording and playback device. The buttons are connected to a memory chip through a microprocessor and the recording capacity of a segment of the chip is determined and used. The recorded segment may be played back at a later point in time. This is unlike the present invention in that no cover is seen disposed over the buttons on the device and that no specific playback is called for by the depressing of the button.

In U.S. Pat. No. 5,609,508 issued to Richard C. Wingate on Mar. 11, 1997 there is disclosed a toy telephone with a visual display and audio storage to allow the recording of audio and image data that can be retrieved and played by a predetermined sequence of keypresses and also includes a programmable timer to retrieve these recorded messages at certain times. This is dissimilar from the present invention in that no cover is seen over the buttons to make the retrieval of the recorded message a two-step operation.

U.S. Pat. No. 5,513,993 issued to Cathy R. Lindley et al. on May 7, 1996 discloses an educational 911 training device. This includes a replica telephone with a headset, a speaker, and a plurality of buttons. Unlike the present invention, the buttons do not have the hinged covers of the instant invention.

Another patent of interest is U.S. Pat. No. 5,474,484 issued to Julie A. Lemelle on Dec. 12, 1995. This is a doll that is used to teach children to use the 911 system. The device includes a simulated telephone key set and has a prerecorded tape that includes the types of instructions and requests that an emergency operator would use. Unlike the present invention, there is no teaching of the hinged, pop-up cover located over the buttons to activate predetermined recording segments.

U.S. Pat. No. 5,382,188 issued to Dalita R. Tomellini on Jan. 17, 1995 discloses an audio playback device resembling a telephone. A memory is included having a plurality of sound tracks corresponding to images on an image plate. With a selector dial and an output unit, selected soundtracks are played when a switch assembly is activated. No indicia on button covers, as is required by the present invention, is taught in the Tomellini device.

In U.S. Pat. No. 5,285,437 issued to Yukuo Yokota et al. on Feb. 8, 1994 there is an audio device disclosed that includes cards having visual indicators and an optical sensor within the device that distinguishes marks on the card and that then plays associated prerecorded material. Unlike the present invention, there is no plurality of buttons on the body of the device relating to specific indicia.

U.S. Pat. No. 5,184,971 issued to Susan A. Williams on Feb. 9, 1993 discloses a toy telephone recorder. Buttons with illustrations are mounted on the unit. Pressing these buttons allows either a prerecorded message to be activated or, with the simultaneous pressing of a record button, to allow a new message to be recorded at the associated memory location. This is clearly dissimilar from the present invention with no teaching of the novel hinged button covers.

U.S. Pat. No. 5,145,447 issued to Adolph E. Goldfarb on Sep. 8, 1992 shows a multiple choice verbal sound toy. Unlike the present invention, there are no covers on the buttons that bring forth various supplemental sounds. Thus the Goldfarb device does not have the two step operation that leads the user from the single symbol to the related representational symbol that then, in turn, activates is an associated recording playback.

Next is U.S. Pat. No. 5,059,126 issued to Dan V. Kimball on Oct. 22, 1991. This is a sound association and learning system where recognizable bird pictures are associated with scannable bar codes. Scanning the relevant barcode generates a unique index that points to the relevant birdsong stored on a Compact Disc. Unlike the present invention, there are no buttons, or button covers including indicia and symbols related to one another taught.

In U.S. Pat. No. 4,648,086 issued to Eishe Koika on Mar. 3, 1987 there is disclosed a sound reproducing device. Unlike the present invention, there are no labeled hinged covers over the various buttons on the apparatus.

Lastly, U.S. Pat. No. 4,103,452 issued to Richard G. Wood on Aug. 1, 1978, U.S. Pat. No. 3,769,744 issued to Thomas E. Sloane, Jr. et al. on Nov. 6, 1973, U.S. Pat. No. 3,548,536 issued to Marvin I Glass et al. on Dec. 22, 1970, and U.S. Pat. No. 1,808,037 issued to Wyman N. Hill on Jun. 2, 1931 all disclose children's telephones or toy telephones. As in the patents mentioned above, in none of them are the novel marked button covers of the present invention taught.

None of the above inventions and patents, taken either singly or in combination, is seen to describe the instant invention as claimed.

SUMMARY OF THE INVENTION

The present invention is a novel educational audio playback device which, in the preferred embodiment, is in the shape of a simulated telephone. On the body of the apparatus are a plurality of buttons, each of the buttons having a hinged cover mounted thereon. These hinged covers have indicia on their front, this indicia, in the preferred embodiment, being letters of an alphabet. Upon the user opening the hinged cover, a simulated sound of a telephone ringing is generated and the associated button is exposed. On each of the buttons is a symbol or picture that is representative of an object or thing that is related to the letter of the alphabet on the hinged cover. The letter "H", for example, could contain a picture of a nursery rhyme figure, such as Humpty Dumpty. Upon the user depressing the associated button, an index is generated that tells a circuit or microprocessor where on the internal sound storage portion of the device is to be found the appropriate sound segment. In the proposed circumstance, a voice would introduce itself as Humpty Dumpty, would note that Humpty Dumpty begins with the letter H, and would, perhaps, recite some or all of the nursery rhyme. The two-step process involved assists in the user remembering the relationship between the letter indicia, and the symbol or character associated with it. Various alphabets could be displayed, with an appropriate symbology and various types of sound storage devices, such as Compacts Discs, audio tape, RAM or ROM could be employed, and additionally the unit could simply be used as an audio playback device.

Accordingly, it is the principal object of the invention to provide an educational audio playback device that overcomes the limitations in the prior art.

It is another object of the invention to provide an educational audio playback device where a two-step process, from the indicia on the button cover, to the related symbol or figure on the button itself, is employed to aid in connecting the first symbol to the second, with its associated audio segment.

Another object of the invention is to provide an educational audio playback device where the apparatus exterior simulates the exterior of a telephone.

Still yet another object of the invention is to provide an educational audio playback device where the opening of the hinged cover results in a sound resembling that of a telephone ringing.

Still yet another object of the invention is to provide an educational audio playback device where the hinged cover over the buttons on the apparatus include indicia relating to letters of an alphabet.

Still yet another object of the invention is to provide an educational audio playback device where the representation or symbol on the revealed button is closely related to the linked letter of the alphabet on the associated button cover.

Yet another object of the invention is to provide an educational audio playback device where the pressing of the button generates an index or address for a specific audio segment on a contained sound playback system contained in the apparatus.

Still yet another object of the invention is to provide an educational audio playback device where the sound segment further reinforces the association between the letter on the hinged cover and the representational symbol on the button.

Another object of the invention is to allow for modularity in the apparatus by having the hinged covers, the representational symbols on the buttons, and the sound playback system all be changeable, so that as the user advances in ability and knowledge, the device may be upgraded or modified.

And yet another object of the invention is to provide an educational audio playback device where the apparatus is also usable as a playback device for standard music media or other purposes.

An additional object of the invention is to minimize complexity and cost of fabrication.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 6 is a block diagram showing the relationships between the various elements of the invention when the audio playback device is a RAM or ROM memory, similar to that used in telephone answering machines and the like.

DETAILED DESCRIPTION OF THE PREFERRED EMBODIMENTS

Figure 1:
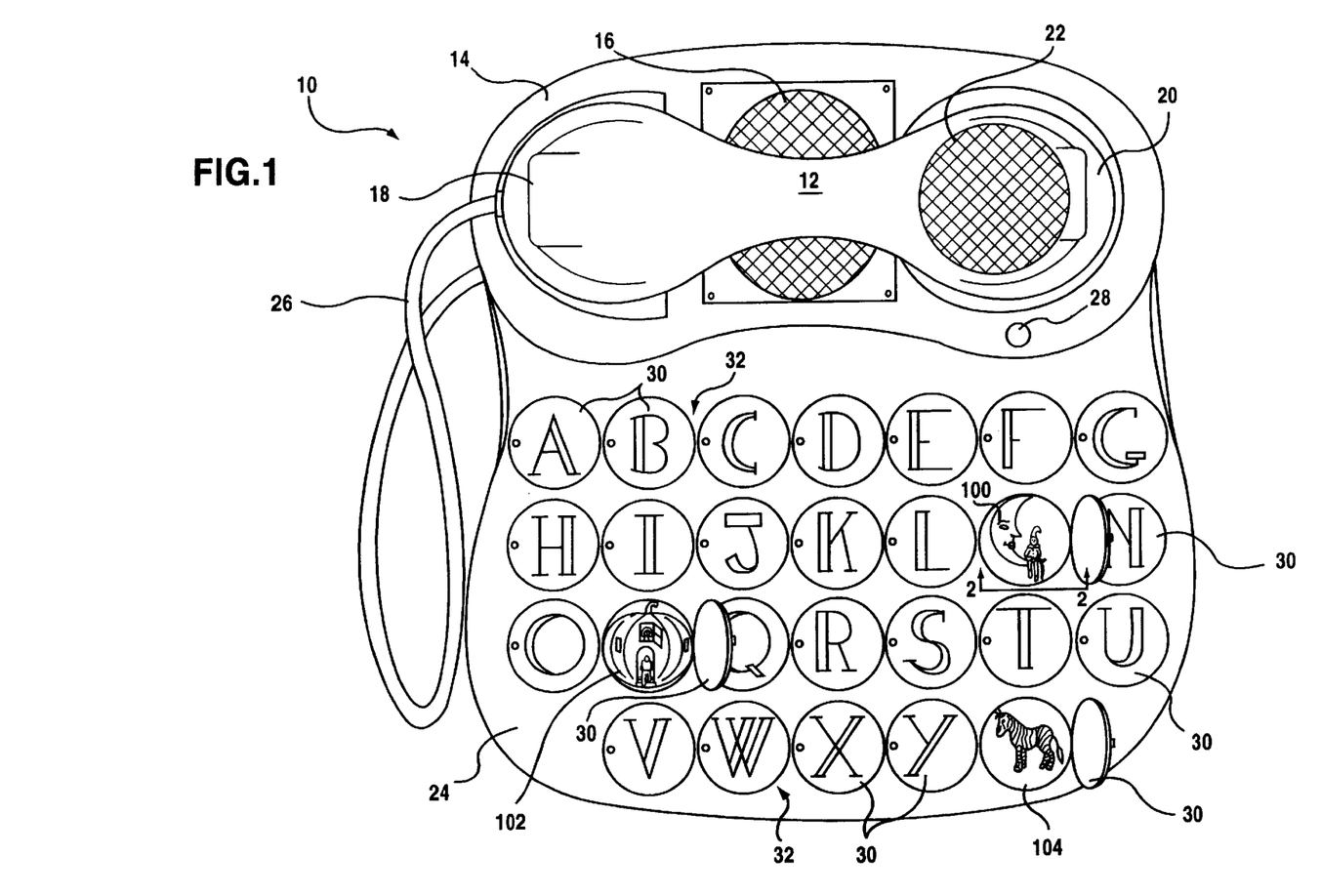
FIG. 1 is a perspective view of an embodiment of the invention where the outer hinged button covers each include a letter of the English alphabet, and where the exposed buttons underneath are fanciful representation of nursery rhyme or storybook characters.

Referring first to FIG. 1, the first embodiment of the invention is show. In this embodiment, generally indicated at 10, the apparatus resembles a telephone. It has a handset 12, on a cradle 14. Under the cradle 14 is an exterior speaker 16. The handset 12 has a mouthpiece 18 and an earpiece 20. In the embodiment contemplated herein, the earpiece 20 has another playback speaker 22 connected to the main body 24 of the invention 10 through the simulated handset cable 26. It also has a standard PLAY button 28 on the outer surface of the unit, which will be discussed further below.

On the front of the unit 10 there are twenty six buttons, each having a spring loaded, hinged cover. Except for the indicia on the hinged covers of the buttons and the representational symbols on the recessed buttons themselves, they are substantially similar in function, only differing in that the activation of each single one of these buttons generates a specific unique index that refers to a sound segment on a prerecorded audio playback device. The structure of the buttons will be discussed first.

Figure 2:
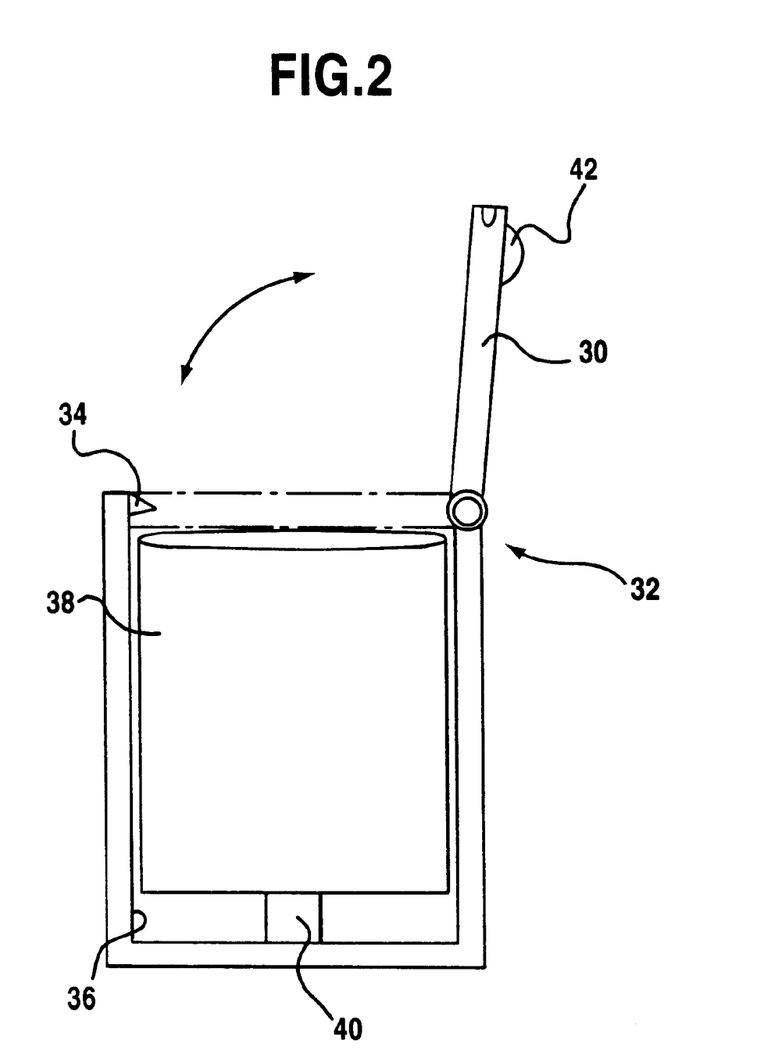
FIG. 2 is a view taken along 2—2 of FIG. 1, showing one of the spring release hinged button covers.

As each of these buttons are substantially similar in function, their similarities will be stressed at the beginning for reasons of clarity. The hinged covers are indicated at 30. They are generally circular in shape. On one side there is a spring loaded hinge 32 and opposite this hinge 32 is a dual position catch 34. This type of catch is a known art device and is the type that releases the cover 30 on a first press down and retains the cover 30 on a subsequent press. In FIG. 1, only three of the covers 30 are open. In the contemplated functioning of the invention, it would be the case that only one of the covers 30 can be open at a time. The three covers 30 open in this Figure are opened show various types of the representational symbols this embodiment uses. Turning to FIG. 2, taken along line 2—2 in FIG. 1, a side view of one of the buttons with its associated cover 30 is seen, along with the spring loaded hinge 32 and the dual position catch 34. recessed inside a cylindrical cavity 36 is the button 38. This rests on a sound activation switch 40. The dual position catch 34 also has initial or alert sound activation, which will be discussed below. In the embodiment seen here, the cover 30 also has a knob or grasping means 42 on its top surface. This is simply for the convenience of the user, who being in many cases a small child, might need the help.

Note that in the under the three open covers 30, the exposed representational symbols are related to the indicia on the covers 30. For example, under the cover 30 that has on it the letter "M" (not seen in the Figure) button 38 carries a representation of the Man on the Moon 100. In a like manner, the button 38 under cover 30 that carries the letter "P" has a representation of Peter Pumpkin Eater 102. Carrying on in the same vein, the button 38 under cover 30 that carries the letter "Z" shows a representation of Zippy the Zebra 104. These representational symbols are related to the letter on their associated cover 30 in that they begin with that letter. Additionally, these representations are either well known through nursery rhymes or are memorable in that they would be objects of interest and enjoyment to a child. These children's character are well known.

Figure 4:
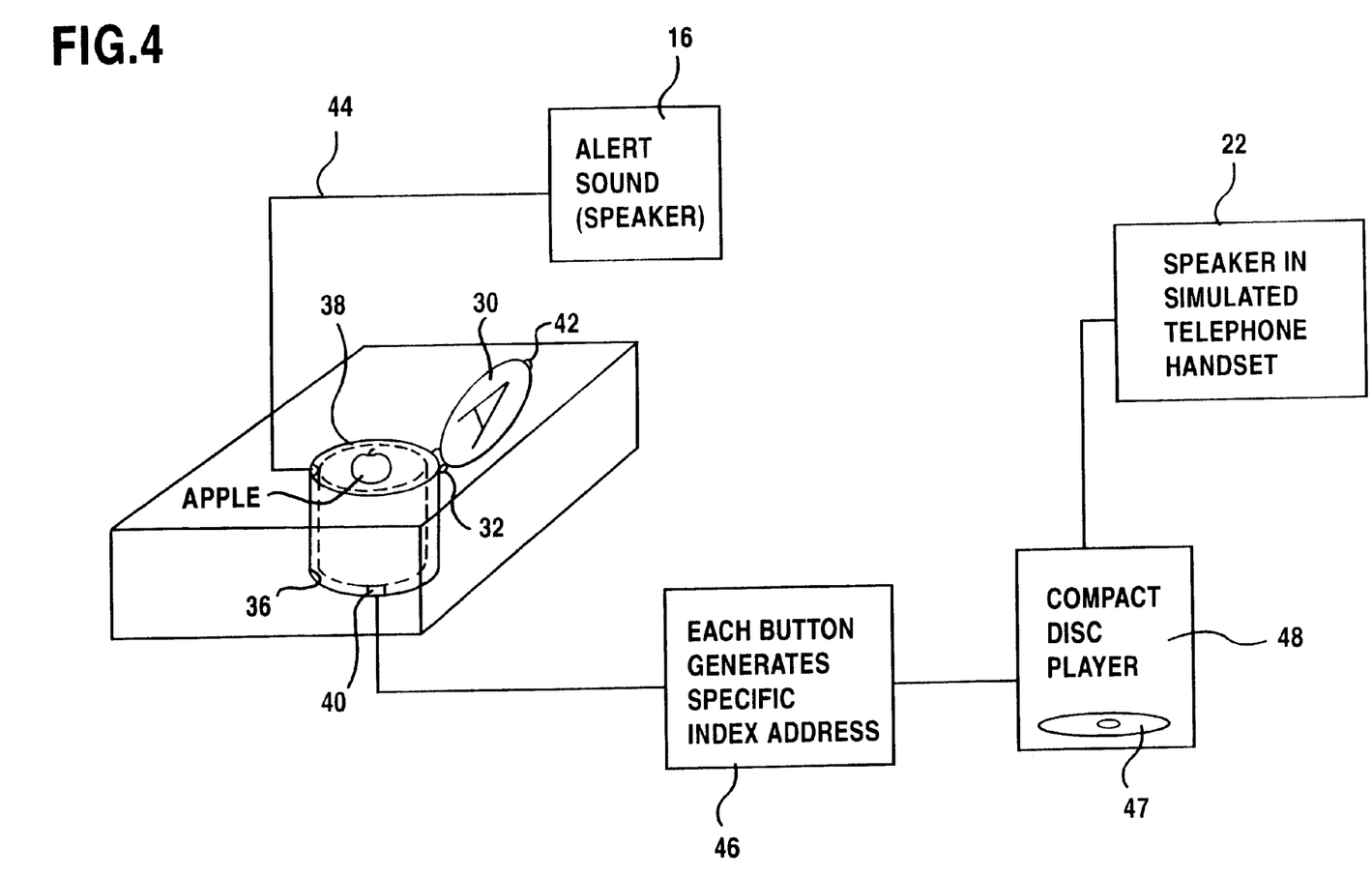
FIG. 4 is a block diagram showing the relationships between the various elements of the invention when the audio playback device is a Compact Disc player.
Figure 5:
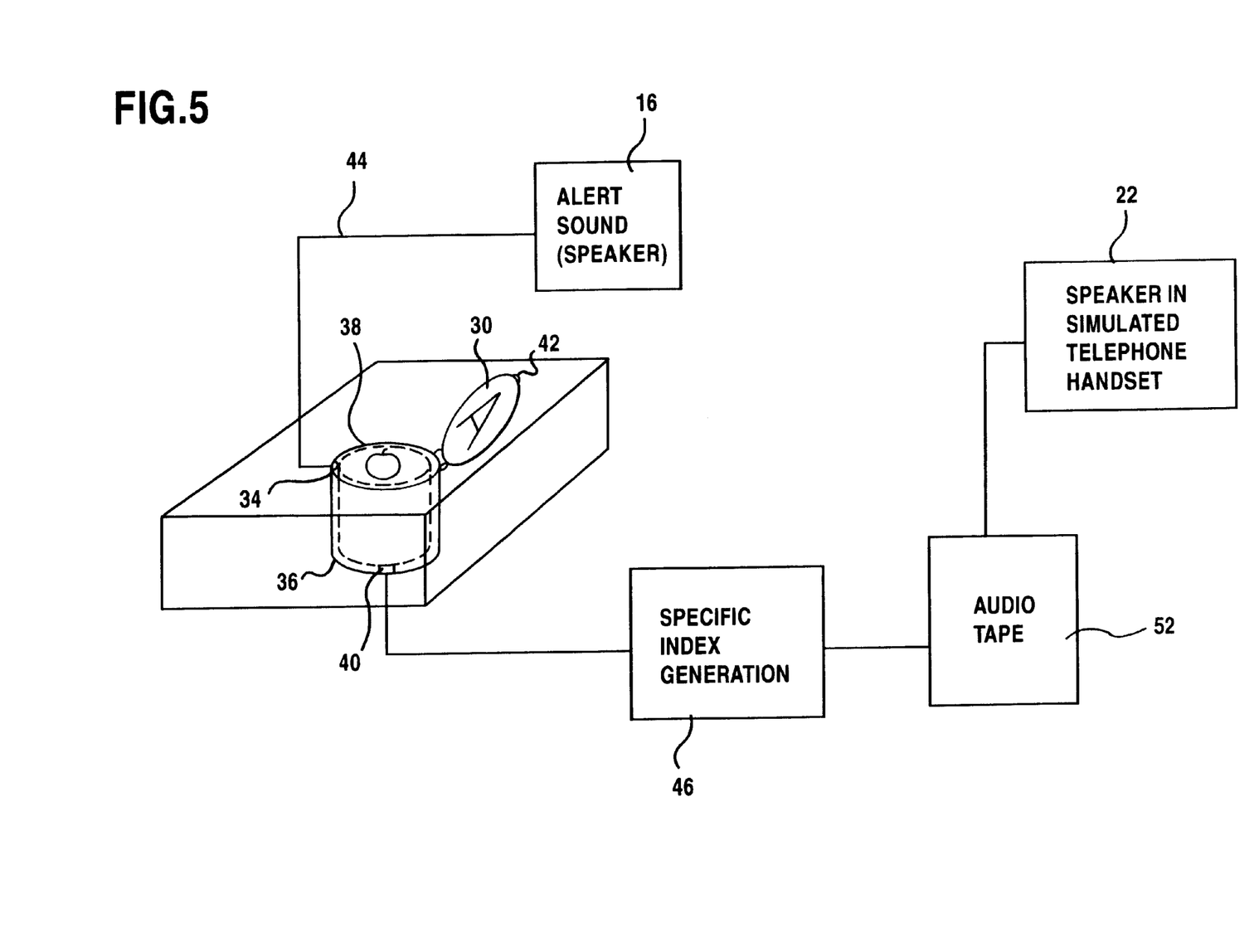
FIG. 5 is a block diagram showing the relationships between the various elements of the invention when the audio playback device is an audio tape player.
Figure 6:
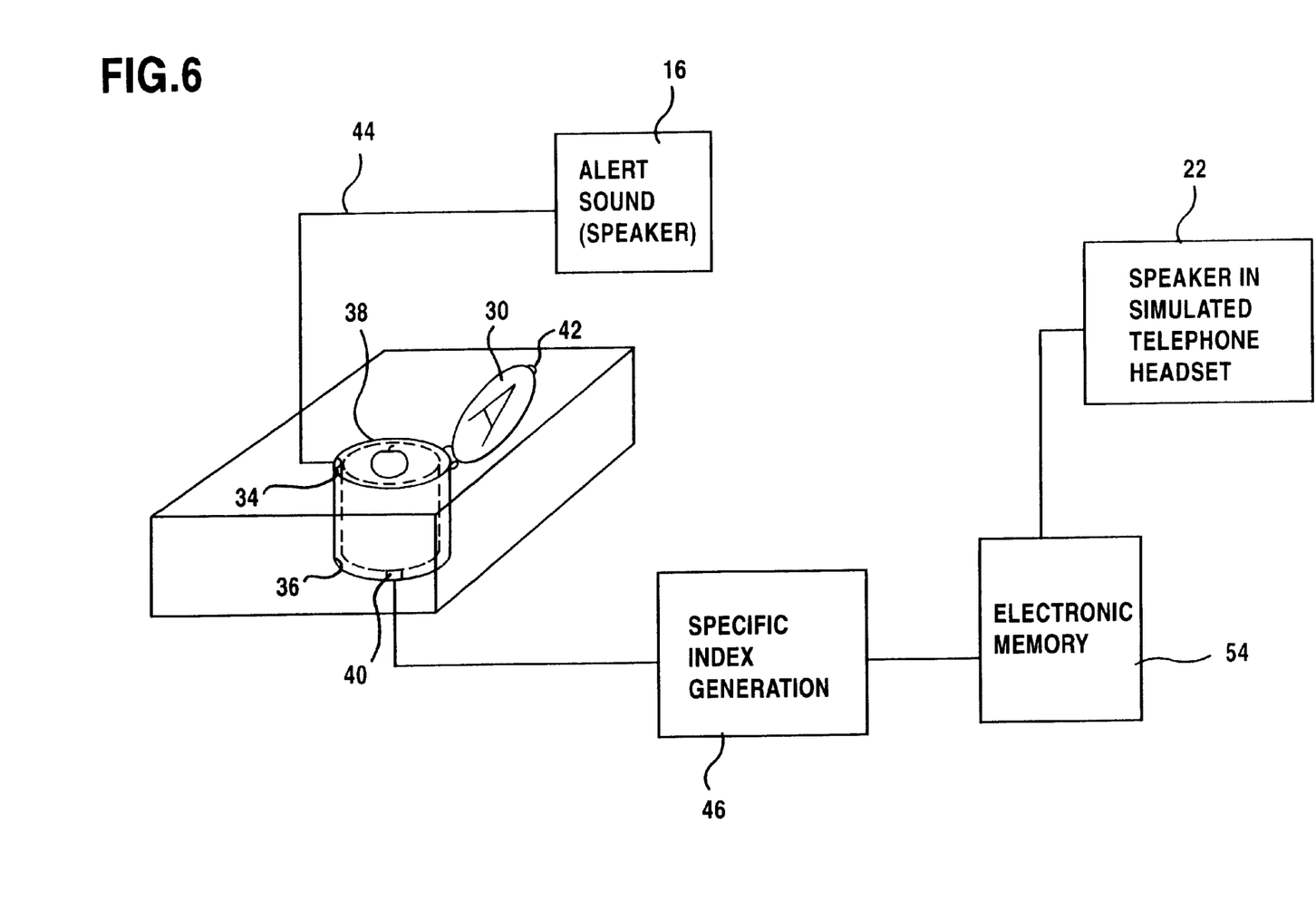

With reference now to FIG. 4, the operation of one embodiment of the invention will be described in some detail. In this embodiment, the audio playback device is a Compact Disc (CD) player. As will be discussed further below, other types of audio playback devices are contemplated and could easily be substituted. The user activates the device 10 by first opening cover 30. The catch releases and sends a signal, indicated at 44 to the exterior speaker 16, both seen in FIG. 4. In this embodiment, the alert sound itself is a simulated ringing of a telephone and the sound comes from the exterior speaker 16, indicated in FIG. 1 proximate the cradle 14. It should be noted that this alert sound speaker could be the playback speaker 22 in the earpiece 20. Also note that the source of the alert sound could be onboard memory (not shown) or the audio playback device as discussed further below. As another example of the type of representational or symbolic picture on the exposed button 38, let us say that the chosen cover 30 had on it the letter "H". The exposed button 38 could then possibly carry a picture of Humpty Dumpty sitting on top of a wall. When the exposed button 38 was then pressed by the user, the ringing coming from exterior speaker 16 would stop, and a voice would proceed to introduce itself as Humpty Dumpty. The character would explain that his name began with the letter "H" and then could recite that well known story. The character may further state other words which start with the letter "H". To accomplish this, each button 38 on the device 10 generates a specific index or address in a processor, indicated in FIG. 4 at 46. This, in turn, refers to a specific track on the CD 47 in the Compact Disc player 48. This track begins and plays to its conclusion through the playback speaker 22 in the earpiece 20 of handset 12. Referring to FIG. 5, it can be seen that an audio tape 52 could be used, where the specific index address would denote a location on an audio tape with the same overall result. Referring to FIG. 6, Random Access or Read Only electronic Memory 54 could also be used, both of these embodiments being similar to the index address capabilities of well known telephone answering machines.

The two-step operation of the device described herein leads to enhanced understanding of the relationship between the initial indicia on the cover 30 and the related symbols on the button 38 that the hinged cover exposes as it is opened. More manual exertion and subsequent mental stimulation is required in the operation of the apparatus, leading to improved mental retention of the learned material. In addition, the covers 30, buttons 38, and the Compact Disc 47 could be changeable in that once the child or the student became adept at recognizing the relationships, the cover indicia, symbol buttons, and audio playback media could be switched to a more challenging set.

Figure 3:
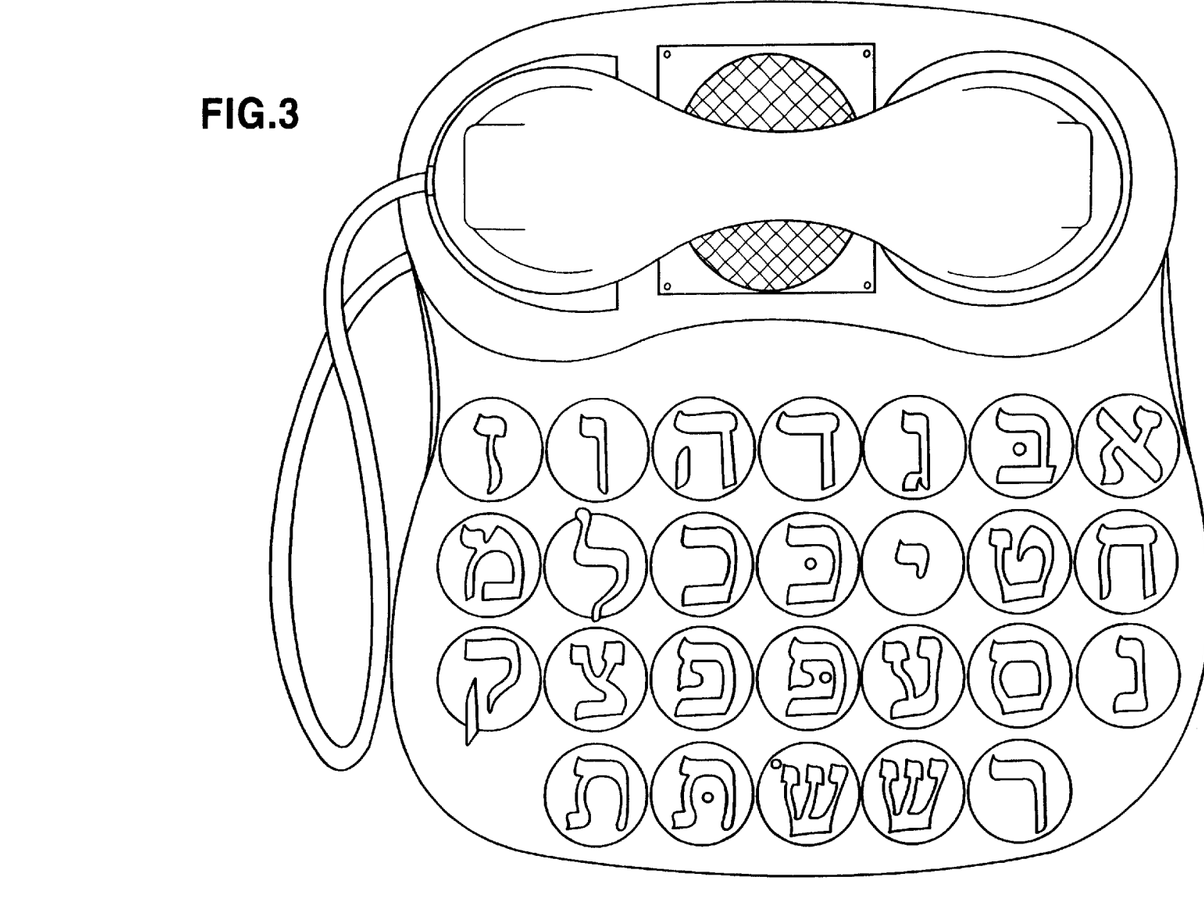
FIG. 3 is a view of a second embodiment of the invention where the indicia on the hinged covers of the buttons comprise letters in the Hebrew alphabet.

Another contemplated embodiment of the invention is seen in FIG. 3. In this embodiment, the covers, indicated at 50, have on them the letters of the Hebrew alphabet. This could be used in religious education or language teaching. Any alphabet with corresponding symbols could be initially taught with the same type of apparatus.

Another feature of the present invention, seen in both FIGS. 1 and 3, is the standard PLAY button, indicated at both at 28. The pressing of this button would allow for the insertion of a standard Compact Disc or audio tape into the device and its subsequent play in a normal mode.

It should also be understood that the simulated appearance of the device could be that of other objects than a telephone. It could be made to look like a typewriter, for instance, or a computer console.

The present invention is susceptible to variations and modifications which may be introduced without departing from the inventive concept.

It is to be understood that the present invention is not limited to the embodiments described above, but encompasses any and all embodiments within the scope of the following claims.

I claim:
1. An educational learning system comprising:
 a main body, said main body including a plurality of buttons, each said button including a hinged cover associated therewith, each said hinged cover including a sensor switch with means to sense whether each said hinged cover is in an open or a closed position, and where each said button further includes an activation switch with signal generation means to generate a unique specific signal for each said button when one said button is manually engaged;

alert sound means, said alert sound means including a speaker, said speaker emitting a predetermined alert sound when any of said sensor switches of any of said hinged covers senses that any of said hinged covers in an open position;

a signal processing means, where said signal processing means generates an index for an audio playback device, said index determined by each unique specific signal from each of said plurality of buttons when one said button is manually engaged; and where said audio playback device plays a predetermined audio segment depending on said generated index.

2. The educational learning system according to claim 1 wherein said audio playback device is a compact disc player containing a compact disc and said generated index refers to a specific track on said compact disc.

3. The educational learning system according to claim 2, wherein said hinged cover includes unique indicia on its outer surface and where said associated button of each said hinged cover includes a unique symbol relating to said unique indicia.

4. The educational learning system according to claim 2, wherein said main body of said system is simulative of a telephone and includes a handset, said handset including a mouthpiece portion and an earpiece portion, and where said predetermined audio segment is played through a second speaker in said earpiece portion.

5. The educational learning system according to claim 4, wherein said predetermined alert sound is indicative of the ringing of a telephone.

6. The educational learning system according to claim 5, wherein alert sound means speaker is located exteriorly of said main body.

7. The educational learning system according to claim 5, wherein alert sound means speaker is said earpiece portion speaker.

8. The educational learning system according to claim 1 wherein said audio playback device is an audio tape player containing a audio tape disc and said generated index refers to a specific location on said audio tape.

9. The educational learning system according to claim 8, wherein said hinged cover includes unique indicia on its outer surface and where said associated button of each said hinged cover includes a unique symbol relating to said unique indicia.

10. The educational learning system according to claim 8, wherein said main body of said system is simulative of a telephone and includes a handset, said handset including a mouthpiece portion and an earpiece portion, and where said predetermined audio segment is played through a second speaker in said earpiece portion.

11. The educational learning system according to claim 10, wherein said predetermined alert sound is indicative of the ringing of a telephone.

12. The educational learning system according to claim 11, wherein alert sound means speaker is located exteriorly of said main body.

13. The educational learning system according to claim 11, wherein alert sound means speaker is said earpiece portion speaker.

14. The educational learning system according to claim 1 wherein said audio playback device has a programmable electronic memory and said generated index refers to a specific location in memory.

15. The educational learning system according to claim 14, wherein said hinged cover includes unique indicia on its outer surface and where said associated button of each said hinged cover includes a unique symbol relating to said unique indicia.

16. The educational learning system according to claim 14, wherein said main body of said system is simulative of a telephone and includes a handset, said handset including a mouthpiece portion and an earpiece portion, and where said predetermined audio segment is played through a second speaker in said earpiece portion.

17. The educational learning system according to claim 16, wherein said predetermined alert sound is indicative of the ringing of a telephone.

18. The educational learning system according to claim 17, wherein alert sound means speaker is located exteriorly of said main body.

19. The educational learning system according to claim 17, wherein alert sound means speaker is said earpiece portion speaker.

20. The educational learning system according to claim 3 wherein said symbol is chosen to be a children's character.

* * * * *